United States Patent
Lee et al.

(10) Patent No.: US 11,771,954 B2
(45) Date of Patent: Oct. 3, 2023

(54) METHOD FOR CALCULATING A SWING TRAJECTORY OF A GOLF CLUB USING RADAR SENSING DATA, A RADAR SENSING DEVICE USING THE SAME, AND A RECORDING MEDIUM READABLE BY A COMPUTING DEVICE RECORDING THE METHOD

(71) Applicant: GOLFZON CO., LTD., Seoul (KR)

(72) Inventors: Tae Yang Lee, Daejeon (KR); Da Bin Han, Gimhae-si (KR)

(73) Assignee: GOLFZON CO., LTD., Seoul (KR)

( * ) Notice: Subject to any disclaimer, the term of this patent is extended or adjusted under 35 U.S.C. 154(b) by 172 days.

(21) Appl. No.: 17/417,835

(22) PCT Filed: Dec. 27, 2019

(86) PCT No.: PCT/KR2019/018609
§ 371 (c)(1),
(2) Date: Jun. 24, 2021

(87) PCT Pub. No.: WO2020/139023
PCT Pub. Date: Jul. 2, 2020

(65) Prior Publication Data
US 2022/0072372 A1 Mar. 10, 2022

(30) Foreign Application Priority Data
Dec. 28, 2018 (KR) .......... 10-2018-0171784

(51) Int. Cl.
*A63B 69/36* (2006.01)
*A63B 24/00* (2006.01)
(Continued)

(52) U.S. Cl.
CPC .......... *A63B 24/0003* (2013.01); *A63B 60/46* (2015.10); *A63B 69/36* (2013.01);
(Continued)

(58) Field of Classification Search
CPC ..... A63B 24/0003; A63B 60/46; A63B 69/36; A63B 69/3614; A63B 2220/89;
(Continued)

(56) References Cited

U.S. PATENT DOCUMENTS 6,456,232 B1 * 9/2002 Milnes ............... A63B 24/0021
342/107
7,686,701 B2 * 3/2010 Hasegawa ............. A63B 60/46
473/221
(Continued)

FOREIGN PATENT DOCUMENTS

JP 2007-130245 A 5/2007
JP 6048120 B2 12/2016
(Continued)

OTHER PUBLICATIONS

International Search Report for PCT/KR2019/018609 dated Apr. 14, 2020 from Korean Intellectual Property Office.

*Primary Examiner* — Nini F Legesse
(74) *Attorney, Agent, or Firm* — Revolution IP, PLLC (57) ABSTRACT

The present invention provides a method for calculating a swing trajectory of a golf club using radar sensing data capable of calculating a swing trajectory of a golf club therefrom, a radar sensing device using the same, and a recording medium readable by a computing device recording the calculation method, which calculates the position coordinate information of the golf club through the analysis of the radar signal separately from calculating the motion parameters for the ball through the analysis of the radar signal when the golfer hits the ball with the golf club, and effectively calculate the swing trajectory of the golf club from the calculated position coordinate information of the golf club.

12 Claims, 5 Drawing Sheets

(51) Int. Cl.
*A63B 60/46* (2015.01)
*G01S 13/50* (2006.01)
*G01S 13/62* (2006.01)

(52) U.S. Cl.
CPC ........ *A63B 69/3614* (2013.01); *G01S 13/505* (2013.01); *G01S 13/62* (2013.01); *A63B 2220/89* (2013.01)

(58) Field of Classification Search
CPC ........ A63B 24/0021; A63B 2024/0028; A63B 2102/32; G01S 13/505; G01S 13/62; G01S 7/415; G01S 13/58; G01S 13/685; G01S 13/88; G01S 13/50; G09B 19/0038; G06F 17/00
USPC ................................ 473/150, 221, 222, 409
See application file for complete search history.

(56) References Cited

U.S. PATENT DOCUMENTS

| | | | | |
|---|---|---|---|---|
| 8,142,301 | B2 * | 3/2012 | Haag | .................. G01S 13/58 |
| | | | | 463/3 |
| 2005/0130755 | A1 * | 6/2005 | Lindsay | ............. A63B 24/0021 |
| | | | | 473/151 |
| 2005/0215335 | A1 * | 9/2005 | Marquardt | .......... A63B 69/3685 |
| | | | | 473/131 |
| 2006/0287117 | A1 * | 12/2006 | Dilz, Jr. | ............. A63B 69/3658 |
| | | | | 473/131 |
| 2007/0105639 | A1 | 5/2007 | Hasegawa | |
| 2008/0200274 | A1 | 8/2008 | Haag et al. | |
| 2013/0116808 | A1 * | 5/2013 | Molinari | ............. A63B 24/0003 |
| | | | | 700/91 |
| 2013/0267352 | A1 * | 10/2013 | Choi | ................... G09B 19/0038 |
| | | | | 473/409 |
| 2014/0004969 | A1 | 1/2014 | Jang et al. | |
| 2018/0318644 | A1 * | 11/2018 | Forsgren | ................. G01S 13/88 |

FOREIGN PATENT DOCUMENTS

| | | |
|---|---|---|
| KR | 10-0947898 B1 | 3/2010 |
| KR | 10-1048090 B1 | 7/2011 |
| KR | 10-2011-0133667 A | 12/2011 |
| KR | 10-2015-0116306 A | 10/2015 |
| KR | 10-2015-0139494 A | 12/2015 |
| KR | 10-2016-0054013 A | 5/2016 |

* cited by examiner

METHOD FOR CALCULATING A SWING TRAJECTORY OF A GOLF CLUB USING RADAR SENSING DATA, A RADAR SENSING DEVICE USING THE SAME, AND A RECORDING MEDIUM READABLE BY A COMPUTING DEVICE RECORDING THE METHOD

TECHNICAL FIELD

The present invention relates to a method for calculating a swing trajectory of a golf club using radar sensing data, a radar sensing device using the same, and a recording medium readable by a computing device recording the method. More particularly, the present invention is to analyze a signal reflected from a ball and a signal reflected from a golf club using the Doppler effect of a radar signal, and calculate the ball motion para meter as well as the swing trajectory of the golf club therefrom.

BACKGROUND ART

There have always been attempts to accurately sense a ball and a golf club to analyze the characteristics of a moving ball hit by a golfer and analyze a golf club's swing by a golfer's swing.

Both the golf club and the ball move according to the golf swing, and representative devices for sensing this are a camera sensing device and a radar sensing device.

In particular, the camera sensing device acquires a multi-frame image of a scene in which a golf club hits a ball, and analyzes the obtained multi-frame image, thereby making it easy to sense both the physical characteristics of the golf club and the ball. However, there are limitations in that the sensing range is narrow and it is difficult to accurately sense the spin of the ball.

On the other hand, for radar sensing devices, radar transmission signals can accurately calculate various information about the ball's motion by receiving and analyzing reflected signals reflected by the ball, which has a wide sensing range and allows accurate sensing of the ball's spin.

However, radar sensing devices can accurately collect and analyze sensing data for the ball to accurately calculate important ball motion parameters such as ball spin, while the size of the club's head is large, making it very difficult to draw a trajectory by specifying which point.

As disclosed in many prior arts on radar sensing devices, such as Korean Patent Registration No. 10-0947898 and Japanese Patent Registration No. 6048120, Korean Patent Publication No. 2016-0054013 and Korean Patent Publication No. 2015-01394, most of the prior arts disclosed about radar sensing were about the calculation of ball motion parameters such as ball speed and spin by radar sensing, and there was no prior art about the calculation of club data such as swing trajectories in golf clubs.

Therefore, it is necessary to research and develop ways to calculate not only information about the ball but also information about golf clubs, such as swing trajectory in golf clubs, using sensing data from radar sensing devices.

DISCLOSURE

Technical Problem

An object of the present invention is to provide a method for calculating a swing trajectory of a golf club using radar sensing data capable of calculating a swing trajectory of a golf club therefrom, a radar sensing device using the same, and a recording medium readable by a computing device recording the calculation method, which calculates the position coordinate information of the golf club through the analysis of the radar signal separately from calculating the motion parameters for the ball through the analysis of the radar signal when the golfer hits the ball with the golf club, and effectively calculate the swing trajectory of the golf club from the calculated position coordinate information of the golf club.

Technical Solution

In accordance with an aspect of the present invention, the above and other objects can be accomplished by the provision of a method of calculating a swing trajectory of a golf club using radar sensing data generated by receiving reflected radar signals, wherein the method comprises specifying an impact time point of a golf club and a ball using the radar sensing data, generating a swing trajectory area for indicating a swing trajectory of the golf club from the radar sensing data, setting an impact position at the specified impact time point on the swing trajectory area, and calculating the swing trajectory of the golf club generated by calculating the coordinates of the golf club at a plurality of sensing times before and after the impact time point on the swing trajectory area.

Preferably, the specifying the impact time point comprises, generating data including signal data for the ball and signal data for the golf club as the radar sensing data by receiving the reflected radar signal, and specifying a time point on the signal data for the golf club based on the signal data for the ball as the impact time point.

Preferably, the generating the swing trajectory area comprises, generating a first coordinate plane viewed from above and a second coordinate plane viewed from the side as the swing trajectory area, respectively.

Preferably, the setting the impact position comprises, setting by indicating the impact position on the swing trajectory area using the reference distance, which is the distance between the radar sensing device and the position where the ball is placed, and the phase information of the signal for the golf club at the specified impact time point.

Preferably, the calculating the swing trajectory of the golf club comprises, calculating the swing trajectory of the golf club by deriving the tendency of the movement of the golf club based on the coordinates of the golf club on the swing trajectory area.

Preferably, the calculating the swing trajectory of the golf club comprises, calculating coordinates of the golf club at each sensing time for the golf club before the impact time point from the signal data for the golf club of the radar sensing data with respect to positions of the golf club before the set impact position and indicating the coordinates of the golf club before the impact time point on the swing trajectory area, and calculating coordinates of the golf club at each sensing time for the golf club after the impact time point from the signal data for the golf club of the radar sensing data with respect to positions of the golf club after the set impact position and indicating the coordinates of the golf club after the impact time point on the swing trajectory area.

Preferably, the calculating the swing trajectory of the golf club comprises, specifying each of the sensing times of the reflected signal for the golf club at preset time intervals before and after the impact time point on the signal data for the golf club of the radar sensing data, calculating coordinate values of the golf club at each sensing time using the phase and velocity values at each of the sensing time points before the impact time point, and indicating the coordinates of the golf club at position on the swing trajectory area corresponding to the calculated coordinate values of the golf club before the impact time point, and calculating coordinate values of the golf club at each sensing time using the phase and velocity values at each of the sensing time points after the impact time point, and indicating the coordinates of the golf club at position on the swing trajectory area corresponding to the calculated coordinate values of the golf club after the impact time point.

Preferably, the calculating the swing trajectory of the golf club comprises, specifying each of the sensing times of the reflected signal for the golf club at preset time intervals before and after the impact time point on the signal data for the golf club of the radar sensing data, calculating coordinate values of the golf club at each sensing time using the phase and velocity values at each of the sensing time points before the impact time point, and indicating the coordinates of the golf club at position on each of the first coordinate plane and the second coordinate plane corresponding to the calculated coordinate values of the golf club before the impact time point, and calculating coordinate values of the golf club at each sensing time using the phase and velocity values at each of the sensing time points after the impact time point, and indicating the coordinates of the golf club at position on each of the first coordinate plane and the second coordinate plane corresponding to the calculated coordinate values of the golf club after the impact time point.

Preferably, the method further comprises, calculating the swing trajectory of the golf club by removing outlier data through preset data processing for the coordinate data of the position of the golf club indicated in the swing trajectory area and performing fitting processing on inlier data.

In accordance with another aspect of the present invention, there is provided a recording medium readable by a computing device recording the method of calculating the swing trajectory of a golf club as stated above.

In accordance with another aspect of the present invention, there is provided a radar sensing device, wherein the radar sensing device comprises a signal transmitter for transmitting a radar signal, a signal receiver for receiving a reflected signal reflected from the ball and the golf club with respect to the radar signal of the signal transmitter, a signal analyzer for processing to specify an impact time point of the golf club and the ball using the radar sensing data, generate a swing trajectory area for indicating the swing trajectory of the golf club from the radar sensing data, set the impact position at the specified impact time point on the swing trajectory area, and calculate the swing trajectory of the golf club generated by calculating coordinates of the golf club at a plurality of sensing times before and after the impact time point on the swing trajectory area.

Preferably, the information calculator is configured to calculate the swing trajectory of the golf club by finding a tendency of movement of the golf club based on the coordinates of the golf club on the swing trajectory area.

Preferably, the information calculator is configured for specifying each of the sensing times of the reflected signal for the golf club at preset time intervals before and after the impact time point on the signal data for the golf club of the radar sensing data, calculating coordinate values of the golf club at each sensing time using the phase and velocity values at each of the sensing time points before the impact time point, and indicating the coordinates of the golf club at position on each of the first coordinate plane and the second coordinate plane corresponding to the calculated coordinate values of the golf club before the impact time point, and calculating coordinate values of the golf club at each sensing time using the phase and velocity values at each of the sensing time points after the impact time point, and indicating the coordinates of the golf club at position on each of the first coordinate plane and the second coordinate plane corresponding to the calculated coordinate values of the golf club after the impact time point.

Advantageous Effects

The present invention has an advantageous effect that enabling to calculate the position coordinate information of the golf club through the analysis of the radar signal separately from calculating the motion parameters for the ball through the analysis of the radar signal when the golfer hits the ball with the golf club, and effectively calculate the swing trajectory of the golf club from the calculated position coordinate information of the golf club.

BEST MODE

A method for calculating a swing trajectory of a golf club using radar sensing data according to the present invention and a radar sensing device using the same will be described with reference to the drawings.

First, a constitution of a radar sensing device according to an embodiment of the present invention and a function of each element will be described with reference to FIGS. 1 and 2.

A radar sensing device according to an embodiment of the present invention is basically a device for calculating motion parameters for a moving object (golf ball, golf club, etc.) using the Doppler Effect of radar. As shown in FIG. 1, the radar sensing device 100 is positioned at a predetermined distance from the side of the user 10 holding the golf club 20, that is, the rear of the ball 30 in the traveling direction, and used.

The distance between the radar sensing device 100 and the ball 30 is preferably a reference distance $D_r$, and the radar sensing device 100 is appropriately positioned to correspond to a distance value predetermined by the radar sensing device 100.

The above-described reference distance Dr may be an important reference for both the sensing of the ball and the sensing of the club by the radar sensing device 100.

Figure 2:
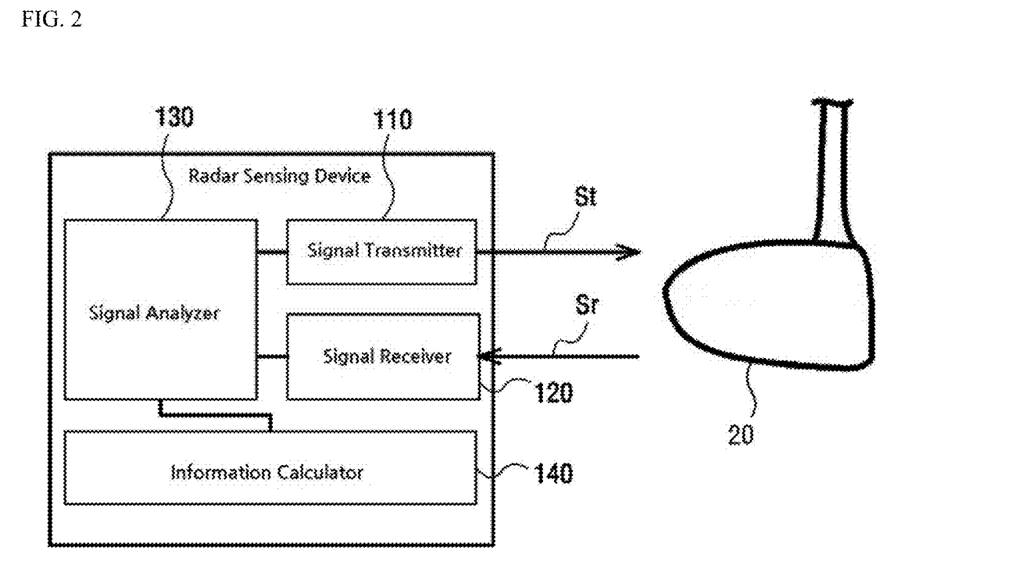
FIG. 2 is a block diagram showing the constitution of a radar sensing device according to an embodiment of the present invention.

Meanwhile, the radar sensing apparatus according to an embodiment of the present invention includes a signal transmitter 110, a signal receiver 120, a signal analyzer 130, and an information calculator 140 as shown in FIG. 2.

The radar sensing device according to an embodiment of the present invention is installed on the ground or near the ground behind a predetermined distance from the position of the ball to be hit by the user, and it may be configured to track the moving ball while transmitting a radar signal of a specific frequency in the direction of movement of the ball to be moved by hitting at the installation position and receiving and analyzing the reflected signals reflected from the moving ball.

The signal transmitter 110 is configured to transmit a specific radar signal in an aimed direction, and although not shown in the drawing, may be configured to include a transmission antenna for transmitting a radar signal.

The signal receiver 120 is configured to receive a reflected signal from which the radar signal transmitted by the signal transmitter 110 is reflected from the ball and returned.

At this time, the radar signal of the signal transmitter 110 arrives at both the ball 30 and the golf club 20, respectively, and the signal receiver 120 receives all reflected signals reflected from each of the moving ball and the golf club head moving along the swing trajectory.

The reflected signal transmitted by the signal transmitter 110 and reflected from the ball and the golf club by the Doppler effect of the radar signal changes the frequency of the signal transmitted by the signal transmitter 110 so that a Doppler shift is will occur. That is, the signal receiver 120 receives signals in which the Doppler shift occurs.

The signal receiver 120 is configured to include a plurality of receiving antennas for receiving the reflected wave signal, so that various information about the movement of the ball and the golf club can be known by using the phase difference of the received signals of each of the plurality of receiving antennas.

Figure 3:
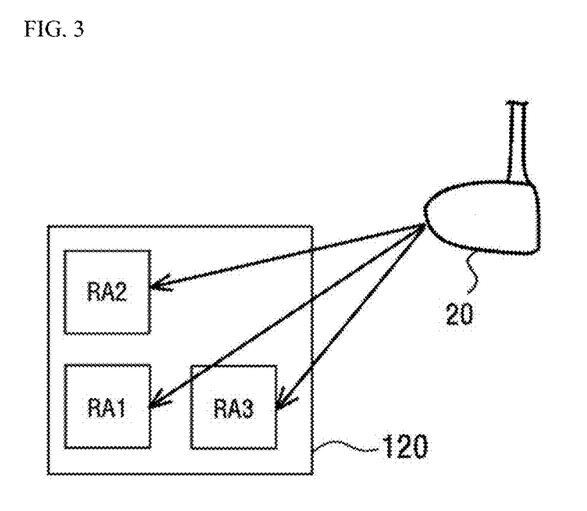
FIG. 3 is a view schematically showing an example of the constitution of a signal receiver of a radar sensing device according to an embodiment of the present invention.

FIG. 3 schematically shows an example of the constitution of the signal receiver 120 of the radar sensing device according to an embodiment of the present invention. As shown in FIG. 3, when the signal receiver 120 properly arranges and provides three or more receiving antennas including RA1, RA2 and RA3, the reflected signal reflected from the golf club 20 is received to each of the receiving antennas RA1, RA2 and RA3. A phase difference between signals between each of the receiving antennas, that is, a phase difference between signals received by RA1 and RA2, and a phase difference between signals received by RA1 and RA3, respectively, may be calculated. The phase difference can be calculated in the same manner as described above for the ball.

Meanwhile, returning to FIG. 2 again, the signal analyzer 130 of the radar sensing device according to an embodiment of the present invention receives the reflected signal of the radar signal from the signal receiver 120 to generate radar sensing data including signal data for the ball and signal data for the golf club.

Figure 4:
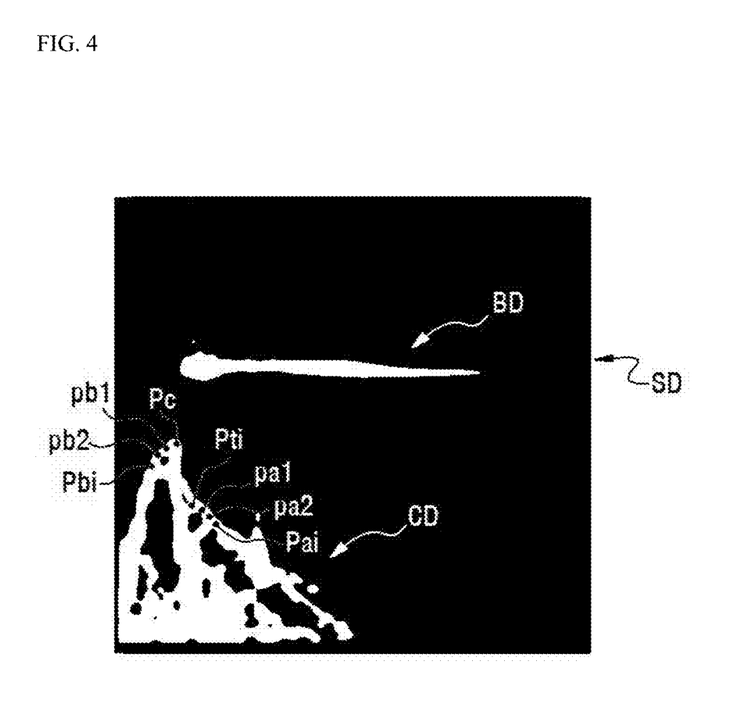
FIG. 4 is a view showing an example of radar sensing data including signal data for a ball and signal data for a golf club generated by a signal analyzer of a radar sensing device according to an embodiment of the present invention using a received radar signal.

FIG. 4 shows an example of the radar sensing data SD including the signal data for the ball BD and the signal data for the golf club CD generated by the signal analyzer 130 using the received radar signal.

The radar sensing data shown in FIG. 4 represents the generation of a spectrogram as radar sensing data with respect to a reflected signal for a ball and a golf club.

In the spectrogram shown in FIG. 4, the horizontal axis is the axis of time and the vertical axis is the axis of frequency. Since the signal data for the ball BD has a narrow and dense distribution of the signal data due to the small size of the ball, a relatively accurate signal range can be generated. However, it can be seen that the signal data for the golf club CD has a relatively wide signal distribution because the size of the club head is relatively large.

As such, since the signal range of the signal data of the golf club is widely distributed unlike a ball, it is very difficult to specify a specific point of the golf club head and calculate the trajectory of the head based on the characteristic point.

Therefore, the golf club swing trajectory calculation method of the radar sensing device according to an embodiment of the present invention, rather than calculating the swing trajectory based on any one characteristic point of the golf club, it is about a method of finding a tendency based on the movement path of the overall golf club head through the signal data CD.

To this end, the radar sensing device according to an embodiment of the present invention assumes a virtual area called a swing trajectory area, calculates coordinate values for the position of the golf club from the radar sensing data, indicates the coordinates on the swing trajectory area. The swing trajectory of the golf club is calculated by deriving the tendency of the movement of the golf club based on the indicated coordinate values of the plurality of golf club positions. More specific details on this will be described later.

Meanwhile, returning back to FIG. 2, the information calculator 140 of the radar sensing device according to an embodiment of the present invention may be configured to calculate the swing trajectory of the golf club by calculating the coordinates of the golf club using the radar sensing data generated by the signal analyzer 130 at a plurality of sensing time points.

The radar sensing device may calculate the trajectory of the moving ball by calculating the position coordinates of the ball at predetermined time intervals using signal data for the ball from the starting position of the ball placed on the reference distance.

In the case of a ball, the ball trajectory can be found by easily calculating the coordinates of the ball based on the position where the ball is placed, that is, the position on the reference distance (that is, the position on the reference distance as the origin). However, in the case of a golf club, it is difficult to use any one point from the top swing to the follow-through as the reference origin. Because the trajectory and tempo from the top swing to the follow-through are different for each person, so it is impossible to establish a certain origin. Therefore, it is quite difficult to calculate the swing trajectory of the golf club by the radar sensing method.

Accordingly, the present invention specifies a time of impact when the head of the golf club and the ball meet, and the swing trajectory of the golf club is calculated by specifying the positional coordinates of the head of each golf club before and after the time of impact as a reference (Hereinafter, expressions such as 'golf club position' or 'golf club coordinates' are used in the meaning of 'golf club head position or coordinates').

In particular, in order to easily calculate the swing trajectory of a golf club, the present invention provides a method of deriving the swing trajectory by creating a virtual area called 'swing trajectory area' on a program and indicating the coordinates of the golf club on the area, and the tendency of a plurality of the indicated coordinates.

An example of the swing trajectory area as described above is shown in FIGS. 5 and 6.

Figure 5:
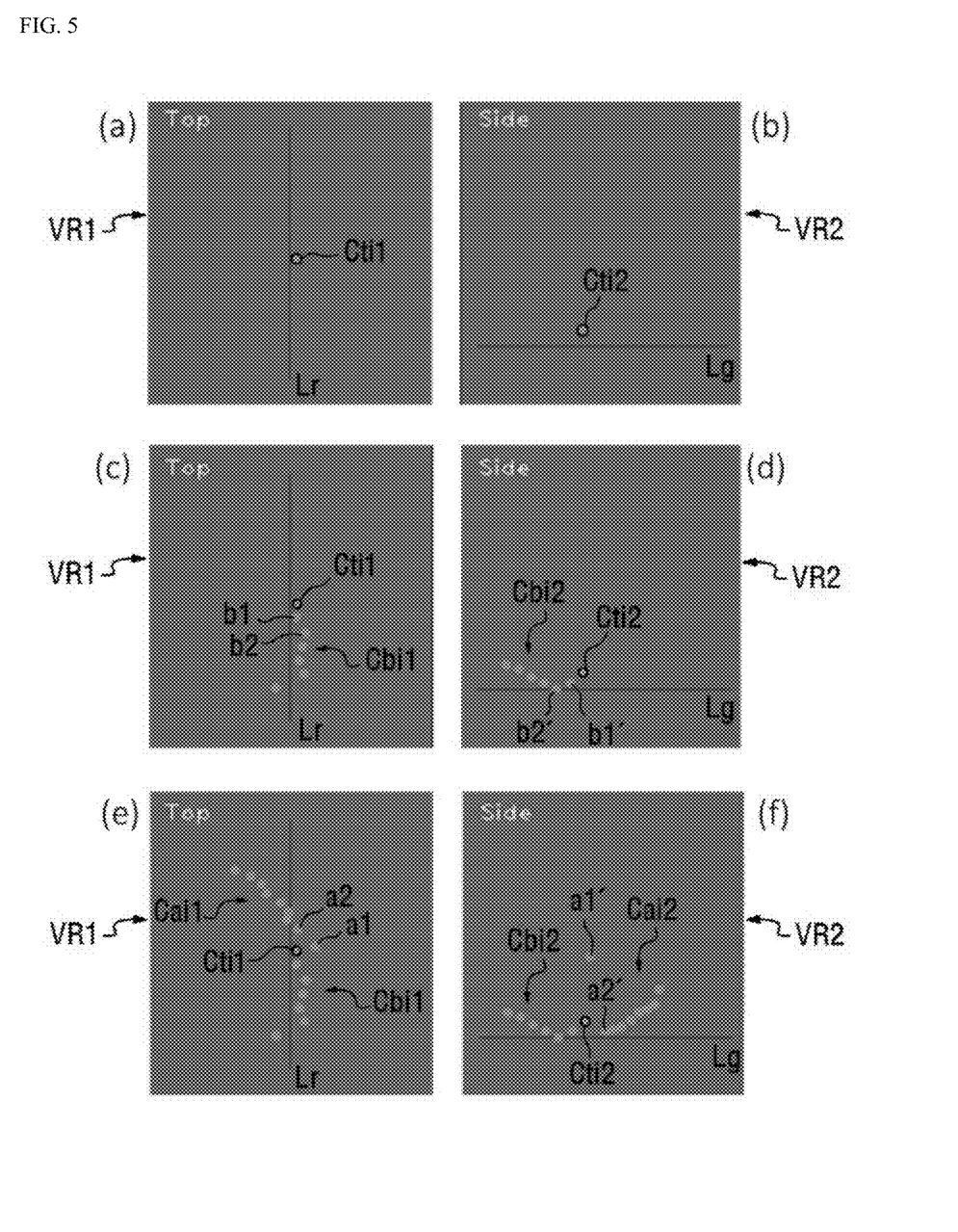
FIGS. 5 and 6 show a process of indicating the position coordinates of a golf club on a first coordinate plane viewed from above and a second coordinate plane viewed from the side as a swing trajectory area, and calculating a swing trajectory by using them according to the golf club's swing trajectory calculation method using radar sensing data based on an embodiment of the present invention.
Figure 6:
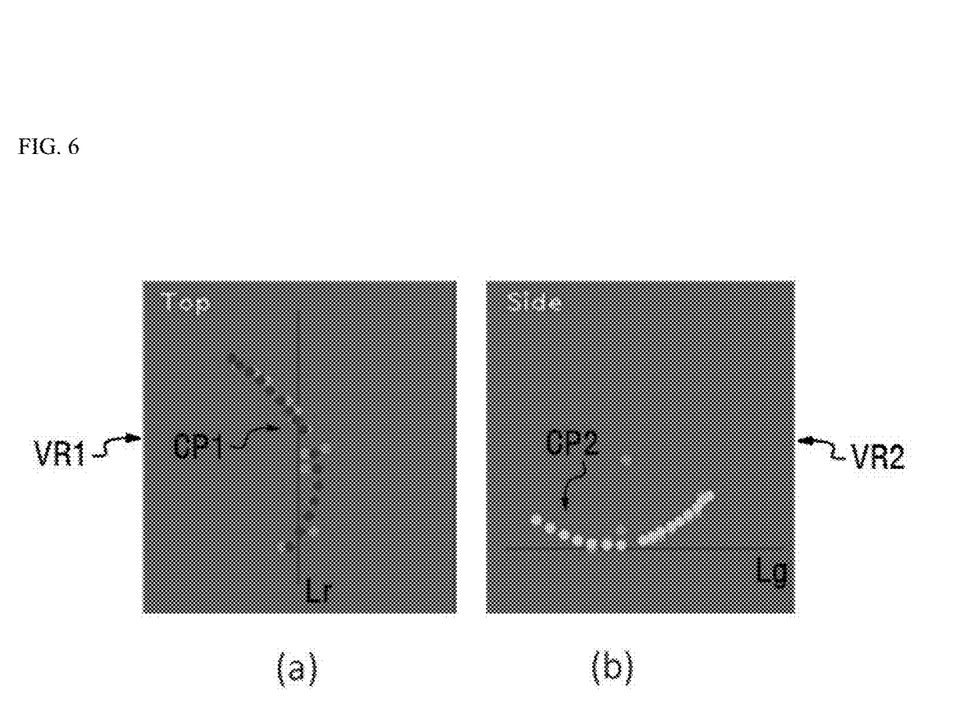

In the present invention, as the swing trajectory area, as shown in FIGS. 5 and 6, a first coordinate plane VR1 viewed from above and a second coordinate plane VR2 viewed from the side can be generated, respectively.

FIGS. 5 (a), (c) and (e) and FIG. 6 (a) show the first coordinate plane VR1, and FIG. 5 (b), (d) and (f) and FIG. 6 (b) show the second coordinate plane VR2.

The swing trajectory area may include at least one of the first coordinate plane VR1 and the second coordinate plane VR2, and may include a three-dimensional virtual area instead of a two-dimensional area.

Whether the swing trajectory area is a two-dimensional region or a three-dimensional region, the method of calculating the coordinates of the golf club and the method of calculating the swing trajectory therefrom are the same (This is because the coordinates of the same position on the first and second coordinate planes can be converted into coordinates on the three-dimensional space).

Accordingly, the information calculator 140 of the radar sensing device according to an embodiment of the present invention specifies a time of impact of the golf club and the ball, and generates a swing trajectory area for providing the swing trajectory of the golf club from the radar sensing data.

Then, by setting the impact position at the time of impact on the swing trajectory area, the coordinates of the golf club at a plurality of sensing time points before and after the position of the impact time on the swing trajectory area are calculated.

As such, it may be configured to calculate the swing trajectory of the golf club generated according to the calculation of the coordinates of the golf club at the plurality of sensing points.

More specifically, the information calculator 140 of the radar sensing device according to an embodiment of the present invention specifies sensing points Pbi, Pai, etc. of the reflected signal for the golf club at a preset time interval before and after an impact time point Pti on the signal data for the golf club CD of the radar sensing data SD as shown in FIG. 4.

Then, the information calculator 140 calculates the coordinates of the golf club at each sensing time point using the phase and velocity values at each of the sensing time points Pbi, etc. before the impact point, and indicates coordinates at positions on the swing trajectory area corresponding to the calculated coordinate values (the indicated coordinates correspond Cbi1 and Cbi2 shown in FIGS. 5 (c) and (d)).

In addition, the information calculator 140 calculates the coordinates of the golf club at each sensing time point using the phase and velocity values at each of the sensing time points Pai, etc. after the impact point, and indicates coordinates at positions on the swing trajectory area corresponding to the calculated coordinate values (the indicated coordinates correspond Cai1 and Cai2 shown in FIGS. 5 (e) and (f)).

In this way, it is possible to calculate the swing trajectory of the golf club based on the coordinate data of the golf club on the swing trajectory area.

Hereinafter, a method for calculating a swing trajectory of a golf club using radar sensing data according to an embodiment of the present invention as described above will be described using the flowchart shown in FIG. 7, and more specific details with respect to the main steps for calculating the swing trajectory will be described with reference to FIGS. 4 to 6 together.

Figure 1:
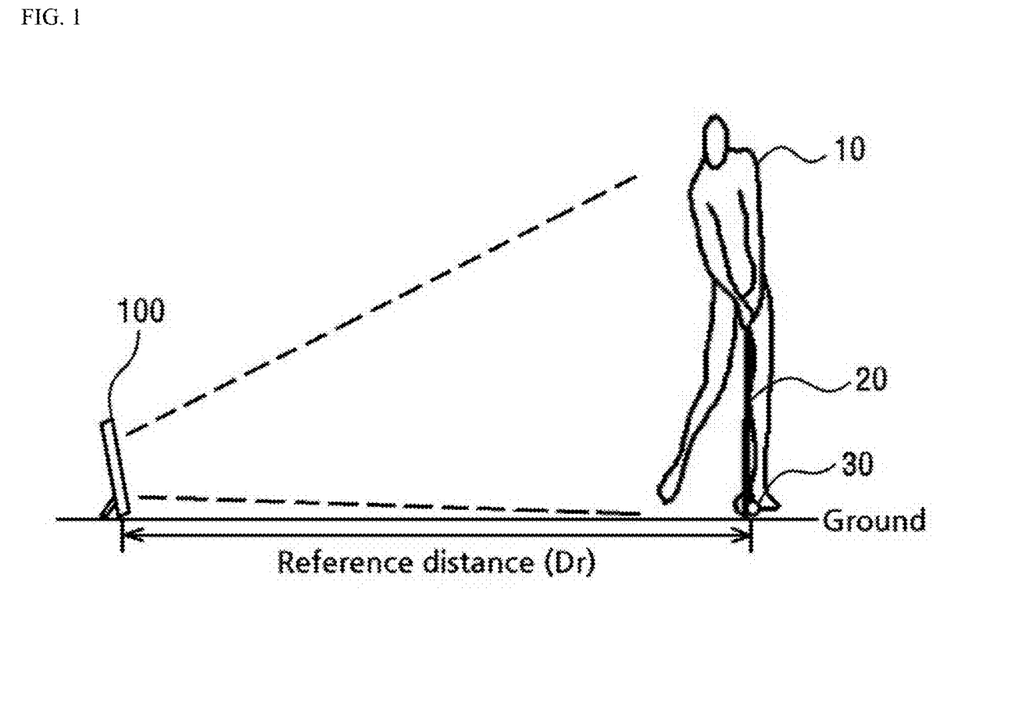
FIG. 1 is a view showing an example of using a radar sensing device according to an embodiment of the present invention.
Figure 7:
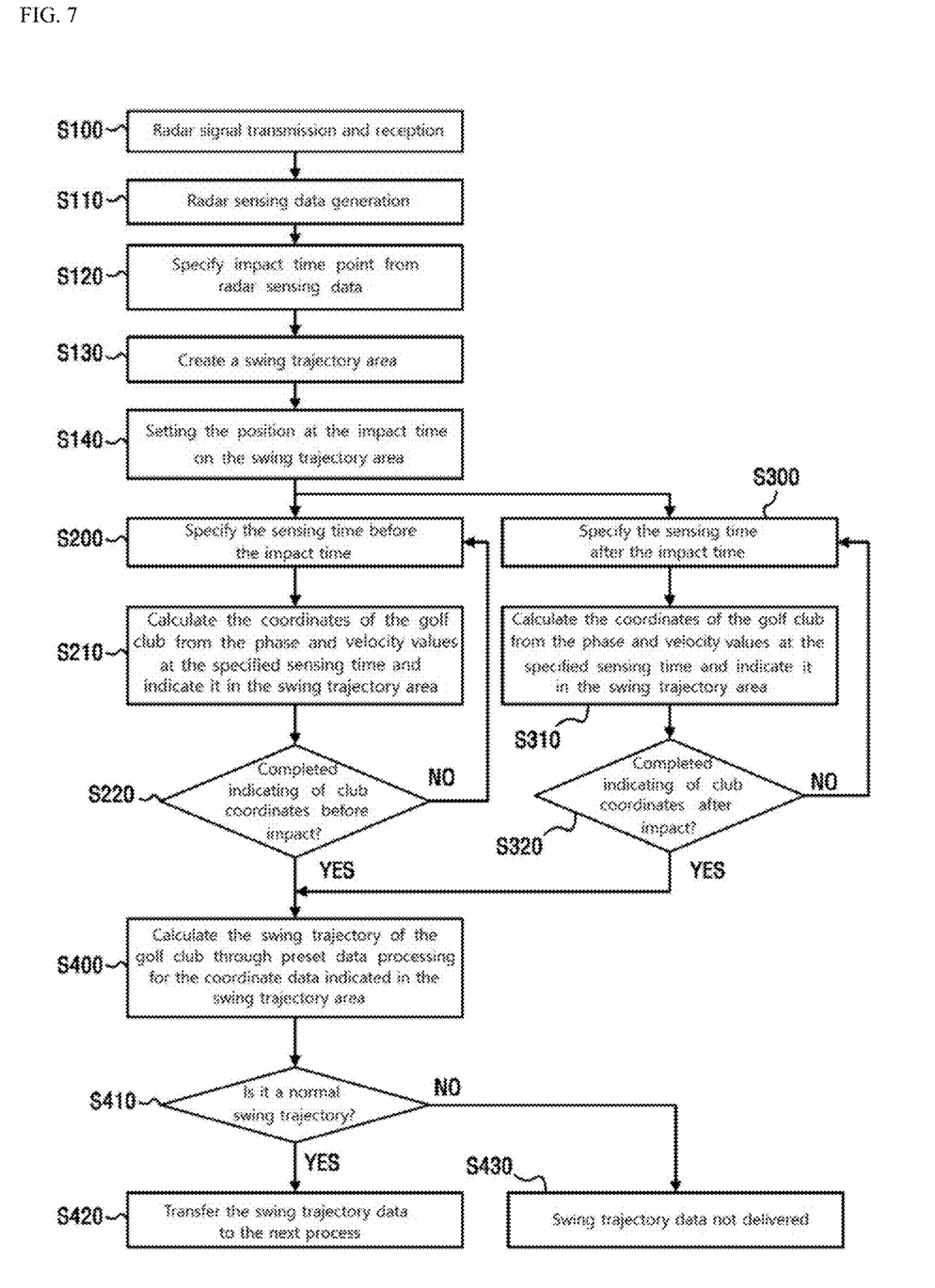
FIG. 7 is a flowchart showing a method of calculating a swing trajectory of a golf club using radar sensing data according to an embodiment of the present invention.

Referring to FIG. 7, the radar sensing device according to the present invention transmits a radar signal in a state in which the radar sensing device is installed such that the reference distance between the radar sensing device and the ball becomes a preset distance value as shown in FIG. 1, and receives a signal reflected by a moving object (ie, a ball and a golf club) S100. It has already been described that this is done by the signal transmitter and the signal receiver, respectively.

The signal analyzer of the radar sensing device generates radar sensing data as shown in FIG. 4 by using the radar signal received by the signal receiver S110.

It has already been described that the radar sensing data may be generated as, for example, a spectrogram of a time axis and a frequency axis.

As shown in FIG. 4, the radar sensing data is divided into signal data for the ball BD and signal data for the golf club CD, respectively. Parameters for the movement of the ball can be calculated using the signal data for the ball BD, and a swing trajectory of the golf club can be calculated using the signal data for the golf club CD.

Meanwhile, in FIG. 7, the information calculator of the radar sensing device according to an embodiment of the present invention specifies an impact time point on the signal data, that is, a time point at which the head of the golf club hits the ball using the signal data for the golf club of the radar sensing data generated by the signal analyzer as described above S120.

As shown in FIG. 4, the impact time point Pti may be determined by specifying a time point on the signal data of the golf club CD based on the signal data of the ball BD.

For example, by specifying a time point on the signal data of the golf club CD at the time when the signal data of the ball BD starts, the impact time point may be determined using the specified time point. Or the impact time point Pti may be specified based on the time point Pc corresponding to the maximum speed of the golf club on the signal data of the golf club CD.

Returning to FIG. 7, the information calculator of the radar sensing device according to an embodiment of the present invention generates a swing trajectory area, which is a virtual area, in order to calculate the swing trajectory of the golf club S130.

The swing trajectory area may include a first coordinate plane VR1 viewed from above and a second coordinate plane VR2 viewed from the side as shown in FIG. 5. Examples shown in FIGS. 5 (a), (c) and (e) are the first coordinate plane VR1, and examples shown in FIGS. 5 (b), (d) and (f) are the second coordinate plane VR2.

The information calculator of the radar sensing device can set a position at the impact time point as a reference for calculating the swing trajectory according to indicating the position at the impact time point on the swing trajectory area using phase information of a radar signal for the golf club at the impact point Pti on the radar sensing data specified in step S120 and a reference distance Dr which is a distance between the radar sensing device and a position where the ball is placed.

FIG. 5(a) shows the setting of the position at the impact point, that is, the impact position Cti1, based on the reference distance on the first coordinate plane VR1 (where Lr is a center line on the first coordinate plane VR1) and FIG. 5

(b) shows the setting of the impact position Cti2 based on the reference distance to the ground Lg on the second coordinate plane VR2.

The first coordinate plane VR1 and the second coordinate plane VR2 represent coordinate planes of different parts of the same virtual space, and each point on the first coordinate plane VR1 and the second coordinate plane VR2 is the same point in one 3D space. That is, Cti1 and Cti2 are the same single point, and points of all coordinates correspond to each other equally.

The first coordinate plane VR1 and the second coordinate plane VR2 are defined by a preset coordinate system, which may be a spherical coordinate system or a Cartesian coordinate system. For example, FIGS. 5 (a), (c) and (e) may be an x-y coordinate plane (a horizontal axis is an x-axis, a vertical axis is a y-axis), and FIGS. 5 (b), (d) and (f) may be an y-z coordinate plane (horizontal axis is y-axis, vertical axis is z-axis).

As described above, after setting the position of the impact point on the swing trajectory area, the information calculator of the radar sensing device can calculate the coordinates Cbi1 and Cbi2 of the golf club before the impact points Cti1 and Cti2, and calculate the coordinates Cai1 and Cai2 of the golf club after the impact points Cti1 and Cti2 so as to calculate the swing trajectory of the golf club based on all the calculated coordinates.

Steps S200 and S210 relate to the calculation of the coordinates of the golf club before the impact point, and steps S300 and S310 relate to the calculation of the coordinates of the golf club after the impact point.

In the case of calculating the coordinates of the golf club before the impact point, the information calculator of the radar sensing device can specify a plurality of sensing points at a preset time interval before the impact point in the radar sensing data (that is, the sensing points of the reflected signals for the golf club)) S200, calculate coordinate values of the golf club from the phase and the speed values of the golf club at the corresponding sensing time, and indicate the calculated coordinates on the swing trajectory area S210.

And, in the case of calculating the coordinates of the golf club after the impact point, the information calculator of the radar sensing device can specify
- a plurality of sensing points of the preset time interval after the impact point in the radar sensing data (that is, the sensing points of the reflected signals for the golf club) S300, calculate coordinate values of the golf club from the phase and the speed values of the golf club at the corresponding sensing time, and indicate the calculated coordinates on the swing trajectory area S310.

Calculating the coordinates of the golf club before the impact time point of S200 and S210 can be a method of calculating the coordinates based on the phase and the speed values of the golf club at each sensing time specified in reverse chronological order based on the impact time point, and calculating the coordinates of the golf club after the impact time point of S300 and S310 can be a method of calculating the coordinates based on the phase and the speed values of the golf club at each sensing time specified in chronological order based on the impact time point.

More specifically with reference to FIGS. 4 and 5, in the signal data of the golf club CD of the radar sensing data SD shown in FIG. 4, the points Pbi at the sensing time before the impact point Pti and the points Pai at the subsequent sensing time points can be specified.

At each sensing time before the impact point Pti, the speed value can be known from the frequency information of the signal for the golf club, and the phase value of the golf club at the corresponding sensing time can be known, respectively. Accordingly, it is possible to calculate position coordinates of the golf club on the swing trajectory area.

For example, it is possible to specify the phase value and the velocity value at pb1, which is the sensing time point before the impact point Pti in FIG. 4, and using this, the coordinates of the point b1 corresponding to the sensing time pb1 as the coordinates before the impact position coordinates Cti1 in the first coordinate plane VR1 shown in FIG. 5 (c) may be calculated.

In addition, In the second coordinate plane VR2 shown in FIG. 5D, as the coordinates before the impact position coordinates Cti2, the coordinates of the point b1' corresponding to the sensing time pb1 may be calculated.

More specifically, the impact position Cti1 in the first coordinate plane VR1 shown in FIG. 5 (a) is specified using the reference distance, however in the state that the coordinates of the golf club before the impact position are unknown, the phase value and the velocity value at the unknown coordinates before the impact position Cti1 can be known through pb1 of the radar sensing data of FIG. 4.

That is, between the unknown coordinates (point) and the impact position coordinates (point) Cti1, the angle between the two points according to the phase value and the distance between the two points according to the velocity value can be known. Alternatively, the velocity vector and vector quantity from the unknown point to the point of the impact position can be known. (The velocity vector includes direction, that is, angle information, and the vector quantity includes distance information).

If the angle and distance values from one point to another are known and the coordinates of one of the two points are specified, the coordinates of an unspecified point in the polar coordinate system, that is, the unknown point, can be calculated. Since the coordinate values in the polar coordinate system are easily converted to the coordinate values in the Cartesian coordinate system, their substance is the same in the end.

In other words, in the first coordinate plane VR1 shown in FIG. 5 (c), there are b1 coordinates and Cti1 coordinates, and the b1 coordinate is an unknown point, but the phase value and velocity value at that point can be known, and Cti1 (the impact position) are specified, the coordinate values of the b1 coordinates can be easily calculated therefrom.

In the second coordinate plane VR2 shown in FIG. 5 (d), the coordinate value of the b1' between the b1' coordinate and the Cti2 coordinate may be calculated in the same manner as described above.

If the b1 coordinates are calculated in the first coordinate plane VR1 shown in FIG. 5 (c), the previous coordinate b2 may also be calculated in the same way. That is, in a state where the b2 coordinate is not determined, the phase value and the velocity value at the corresponding point pb2 on the golf club signal data CD of the radar sensing data SD corresponding to the position can be known, and the b1 coordinate is already specified, the b2 coordinate can be calculated therefrom.

Similarly, in the second coordinate plane VR2 shown in FIG. 5 (d), the coordinate b2' can be calculated using the phase value and the velocity value at the point pb2 on the radar sensing data.

In this way, the coordinates Cbi1 and Cbi2 of the golf club before the impact position coordinates Cti1 and Cti2 on the swing trajectory area VR1 and VR2 using the phase value and speed value of the golf club at each of the plurality of sensing times Pbi before the impact point Pti.

Similarly, since the speed value can be known from the frequency information of the signal for the golf club at each sensing time point after the impact point Pti, and the phase value of the golf club at the corresponding sensing time point can be known, respectively, it is possible to calculate the position coordinates of the golf club on the swing trajectory area therefrom.

Since it is possible to specify the phase value and the velocity value at the impact time point Pti in FIG. 4, in the first coordinate plane VR1 shown in FIG. 5 (e), a1 coordinates that are coordinates after the impact position satisfying the phase value and the velocity value in the impact position coordinate Cti1 may be calculated using the phase value and the velocity value at the impact time point Pti.

Similarly, in the second coordinate plane VR2 shown in FIG. 5 (f), a1' coordinates that are coordinates after the impact position coordinate Cti2 may be calculated using the phase value and the velocity value at the impact time point Pti (a1 coordinates and a1' coordinates correspond to pa1 on the radar sensing data SD).

In addition, since it is possible to specify the phase value and the velocity value at the sensing time pa1 on the radar sensing data in FIG. 4, a2 coordinates, which are coordinates that satisfy the phase value and the velocity value at pa1 in the first coordinate plane VR1 shown in FIG. 5 (e) may be calculated using the phase value and the velocity value at the sensing time pa1 on the radar sensing data.

Similarly, a2' coordinates, which are coordinates that satisfy the phase value and velocity value in pa1 in the second coordinate plane VR2 shown in FIG. 5 (f), may be calculated using the phase value and the velocity value at the sensing time pa1 on the radar sensing data (a1 coordinates and a1' coordinates correspond to pa1 on the radar sensing data SD).

In this way, Coordinates Cai1 and Cai2 of the golf club after the impact position coordinates Cti1 and Cti2 on the swing trajectory areas VR1 and VR2 may be calculated using the phase value and speed value of the golf club at each of the plurality of sensing time points Pai after the impact point Pti.

FIGS. 5 (e) and (f) show that indicating the position coordinates of the golf club during the swing on each of the first coordinate plane VR1 and the second coordinate plane VR2, which are swing trajectory areas, according to the method as described above, However, as described above, because the signal range of the signal data of the golf club is widely distributed, unlike a ball, it is very difficult to specify one characteristic point of the golf club head and calculate the trajectory of the head based on the characteristic point, as shown in FIGS. 5 (e) and (f), the coordinate distribution of the position of the golf club does not appear to the extent that it is accurately called a swing trajectory.

Therefore, it is desirable to find a tendency based on the movement path of the overall golf club head through the signal data CD, and FIG. 6 shows that the swing trajectory is calculated by grasping the tendency by using the coordinate distribution in the swing trajectory area of the golf club shown in FIGS. 5 (e) and (f).

That is, referring to FIGS. 6 and 7, when both the indicating the club coordinates before the impact point and the indicating the club coordinates after the impact point are completed S220 and S320, the information calculator of the radar sensing device according to an embodiment of the present invention can calculate the swing trajectory of the golf club through preset data processing for the coordinate data indicated in the swing trajectory area as described above S400.

The data processing may use a statistical analysis processing method such as method of least squares using the distribution of a plurality of coordinate data as shown in FIGS. 5 (e) and (f), for example, the RANSAC algorithm.

That is, for a plurality of coordinate data as shown in FIGS. 5 (e) and (f), after the valid data (inlier) and the outlier data (outlier) are distinguished through statistical analysis processing such as RANSAC, swing trajectories CP1 and CP2 as shown in FIGS. 6 (a) and (b) can be calculated by removing the outlier and performing a fitting process such as Poly-fit on the inlier.

The data CP1 in FIG. 6 (a) shows a result that is drawn to valid data through statistical analysis processing using the RANSAC algorithm with respect to the coordinate data on the first coordinate plane VR1 shown in FIG. 5 (e) and is processed by fitting processing on the valid data.

And, the data CP2 in FIG. 6 (b) shows a result that is drawn to valid data through statistical analysis processing using the RANSAC algorithm for the coordinate data on the second coordinate plane VR2 shown in FIG. 5 (f) and is processed by fitting processing on the valid data.

In this way, the swing trajectory of the golf club can be calculated, and it can be verified whether the calculated swing trajectory is a normal swing trajectory S410.

For example, if the finally calculated swing trajectory is formed by passing under the ground Lg on the second coordinate plane, it cannot be called a normal swing trajectory.

The verification step of the swing trajectory of step S410 of FIG. 7 is a process of discriminating the abnormal swing trajectory as described above.

This may proceed as a process of constructing data on an abnormal swing trajectory through a number of tests and determining whether the swing trajectory is a normal swing trajectory or not, based on the data on the abnormal swing trajectory.

On the verification process of the swing trajectory, if it is determined that the calculated swing trajectory is a normal swing trajectory, the corresponding swing trajectory data is transmitted to the next process S420, and if it is determined that the swing trajectory is abnormal, the corresponding swing trajectory data is not transmitted S430.

Here, the next process as stated above may be a process of calculating motion parameters of the golf club using the finally calculated swing trajectory data, for instance, the club path, the swing direction, the angle of attack, and the dynamic loft, spin loft, etc. Or the next process as stated above may be a process of outputting to a display device or a mobile terminal connected to a radar sensing device by wire/wireless.

INDUSTRIAL APPLICABILITY

A method for calculating a swing trajectory of a golf club using radar sensing data and a radar sensing device using the same according to the present invention, can be used in golf-related industries where ball trajectory and ball analysis according to golf swing, and in so-called screen golf industry where virtual reality-based golf simulations are implemented to allow users to enjoy virtual golf games.

The invention claimed is:

1. A method for generating a swing trajectory of a golf club using data sensing of movement of a golf club head and a ball by a radar sensing device including a signal transmitter, a signal receiver, a signal analyzer, and a swing trajectory generator, the method comprising:
  transmitting a radar signal by the signal transmitter and receiving a reflected radar signal by the signal receiver, the reflected radar signal reflected from the ball and the golf club head;
  generating, by the signal analyzer, a radar sensing data including signal data for the ball and signal data for the golf club head by analyzing the reflected radar signal of the ball and the golf club head;
  specifying, by the swing trajectory generator, a time point on the signal data for the golf club head at the time when the signal data for the ball starts and determining an impact time point when the golf club head hits the ball;
  generating, by the swing trajectory generator, a swing trajectory area as a virtual area for indicating a swing trajectory of the golf club head from the radar sensing data;
  setting, by the swing trajectory generator, an impact position at the specified impact time point on the swing trajectory area; and
  generating, by the swing trajectory generator, the swing trajectory of the golf club by specifying coordinates of the golf club head at a plurality of sensing times before and after the impact time point on the swing trajectory area.

2. The method according to claim 1, wherein the generating the swing trajectory area comprises,
  generating a first coordinate plane viewed from above and a second coordinate plane viewed from the side as the swing trajectory area, respectively.

3. The method according to claim 2, wherein the generating the swing trajectory of the golf club comprises:
  specifying each of the sensing times of the reflected signal for the golf club head at preset time intervals before and after the impact time point on the signal data for the golf club head of the radar sensing data;
  generating coordinate values of the golf club head at each sensing time using the phase and velocity values at each of the sensing time points before the impact time point, and indicating the coordinates of the golf club head at position on each of the first coordinate plane and the second coordinate plane corresponding to the calculated coordinate values of the golf club head before the impact time point; and
  generating coordinate values of the golf club head at each sensing time using the phase and velocity values at each of the sensing time points after the impact time point, and indicating the coordinates of the golf club head at position on each of the first coordinate plane and the second coordinate plane corresponding to the calculated coordinate values of the golf club head after the impact time point.

4. The method according to claim 1, wherein the setting the impact position comprises,
  setting by indicating the impact position on the swing trajectory area using the reference distance, which is the distance between the radar sensing device and the position where the ball is placed, and the phase information of the signal for the golf club at the specified impact time point.

5. The method according to claim 1, wherein the generating the swing trajectory of the golf club comprises,
  generating the swing trajectory of the golf club by deriving the tendency of the movement of the golf club head based on the coordinates of the golf club head on the swing trajectory area.

6. The method according to claim 1, wherein the generating the swing trajectory of the golf club comprises:
  specifying coordinates of the golf club head at each sensing time for the golf club head before the impact time point from the signal data for the golf club head of the radar sensing data with respect to positions of the golf club head before the set impact position and indicating the coordinates of the golf club before the impact time point on the swing trajectory area; and
  specifying coordinates of the golf club head at each sensing time for the golf club head after the impact time point from the signal data for the golf club head of the radar sensing data with respect to positions of the golf club head after the set impact position and indicating the coordinates of the golf club head after the impact time point on the swing trajectory area.

7. The method according to claim 1, wherein the generating the swing trajectory of the golf club comprises:
  specifying each of the sensing times of the reflected radar signal for the golf club head at preset time intervals before and after the impact time point on the signal data for the golf club head of the radar sensing data;
  specifying coordinate values of the golf club head at each sensing time using the phase and velocity values at each of the sensing time points before the impact time point, and indicating the coordinates of the golf club head at position on the swing trajectory area corresponding to the calculated coordinate values of the golf club head before the impact time point; and
  specifying coordinate values of the golf club head at each sensing time using the phase and velocity values at each of the sensing time points after the impact time point, and indicating the coordinates of the golf club head at position on the swing trajectory area corresponding to the calculated coordinate values of the golf club head after the impact time point.

8. The method according to claim 7, further comprising,
  generating the swing trajectory of the golf club head by removing outlier data through preset data processing for the coordinate data of the position of the golf club indicated in the swing trajectory area and performing fitting processing on inlier data.

9. A recording medium readable by a computing device recording the method according to claim 1.

10. A radar sensing device comprising:
  a signal transmitter for transmitting a radar signal;
  a signal receiver for receiving a reflected radar signal reflected from a ball and a golf club head with respect to the radar signal of the signal transmitter;
  a signal analyzer for analyzing the reflected radar signal of the ball and the golf club head so as to generate a radar sensing data including signal data for the ball and signal data for the golf club head; and
  a swing trajectory generator configured to:
  specify a time point on the signal data for the golf club head at the time when the signal data for the ball starts and determine an impact time point when the golf club head hits the ball,
  generate a swing trajectory area as a virtual area for indicating the swing trajectory of the golf club head from the radar sensing data,
  set an impact position at the specified impact time point on the swing trajectory area, generate the swing trajectory of the golf club generated by specifying coordinates of the golf club head at a plurality of sensing times before and after the impact time point on the swing trajectory area.

11. The device according to claim 10, wherein the swing trajectory generator is configured to generate the swing trajectory of the golf club by finding a tendency of movement of the golf club head based on the coordinates of the golf club head on the swing trajectory area.

12. The device according to claim 10, wherein the swing trajectory generator is configured for specifying each of the sensing times of the reflected radar signal for the golf club head at preset time intervals before and after the impact time point on the signal data for the golf club head of the radar sensing data, specifying coordinate values of the golf club head at each sensing time using the phase and velocity values at each of the sensing time points before the impact time point, and indicating the coordinates of the golf club head at position on each of the first coordinate plane and the second coordinate plane corresponding to the calculated coordinate values of the golf club head before the impact time point, and specifying coordinate values of the golf club head at each sensing time using the phase and velocity values at each of the sensing time points after the impact time point, and indicating the coordinates of the golf club head at position on each of the first coordinate plane and the second coordinate plane corresponding to the calculated coordinate values of the golf club head after the impact time point.

* * * * *